May 1, 1951

R. S. KELTNER 2,551,136

TWO-WAY HITCH

Filed May 27, 1949

INVENTOR.

Ray S. Keltner

BY Victor J. Evans & Co.

ATTORNEYS

Patented May 1, 1951

2,551,136

UNITED STATES PATENT OFFICE 2,551,136

TWO-WAY HITCH

Ray S. Keltner, Enid, Okla.

Application May 27, 1949, Serial No. 95,838

3 Claims. (Cl. 280—33.44)

The present invention relates to the general class of wheeled land vehicles including automotive vehicles, tractors, trailers and other towed implements, and more specifically to a two way hitch or universal coupling joint between a separable motor section and the implement or vehicle towed thereby.

The two way hitch is especially designed as a permanent and component part of the usual draw bar or draft beam of a standard type of tractor, or other automotive vehicle, and means are provided for convenience in coupling and uncoupling a tractor so equipped with the implement or vehicle to be towed. The primary purpose of the invention is the provision of a flexible joint in the draw bar of a tractor by means of which relative movements between a tractor and a coupled trailer may be absorbed and thus prevented from imposing stresses and strains upon the structures of the tractor and trailer.

The novel hitch of my invention includes a minimum number of parts that may be manufactured with facility and low cost of production, and the parts may be assembled and combined with a draw bar with convenience to insure a durable device that is simple in operation.

The invention consists in certain novel features of construction and combinations and arrangements of parts as will hereinafter be described and more particularly set forth in the appended claims. In the accompanying drawings I have illustrated a complete example of a physical embodiment of my invention wherein the parts are combined and arranged in accord with one mode I have devised for the practical application of the principles of my invention. It will however be understood that changes and alterations are contemplated and may be made in these exemplifying drawings and mechanical structures, within the scope of my claims without departing from the principles of the invention.

Figure 1:
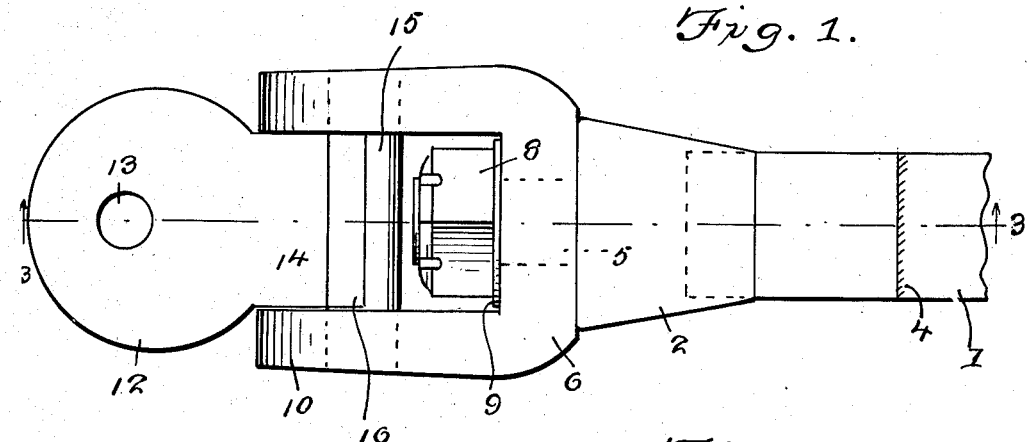
Figure 1 is a top plan view showing part of a draw bar equipped with the novel hitch of my invention.
Figure 2:
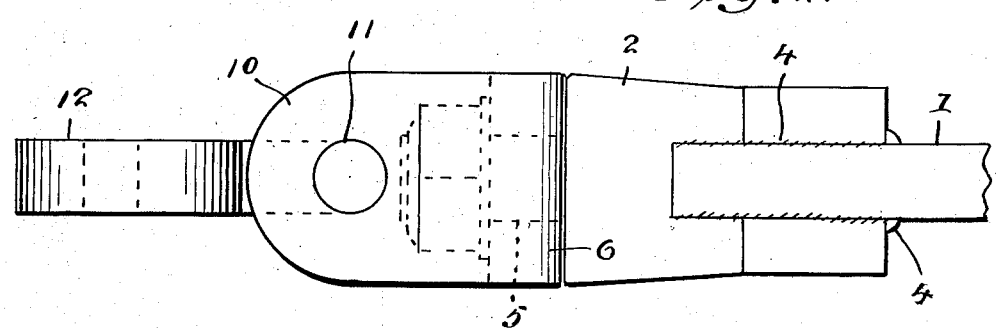
Figure 2 is a side view.
Figure 3:
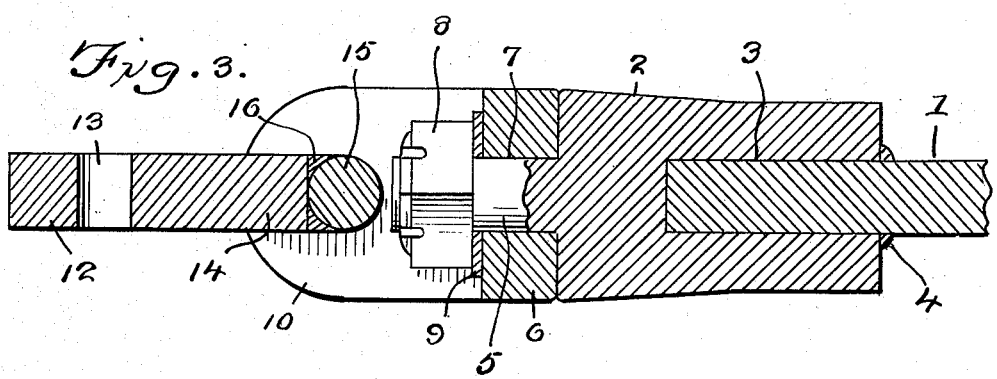
Figure 3 is a longitudinal vertical sectional view of the draw bar and hitch.

The two way hitch or flexible coupling joint forms a component and permanent part of the draw bar 1 which is shown as of upright rectangular shape in cross section and provided with a forked head 2 having a slot 3. The head may be integral with the draw bar, or as here shown the flat draw bar is fitted into the slot of the head and the draw bar and head are welded together, as at 4 to provide a rigid durable and strong structure, at the rear end of the draw bar.

The outwardly flaring head terminates in a longitudinally projecting and integral swivel bolt 5 upon which a U-shaped clevis having a bearing bore 7 is journaled or swiveled on the bolt 5 with a bearing against the face of the head 2. The swiveled clevis is retained on its supporting bolt by means of a lock nut 8 and washer 9, and it will be apparent that the clevis may turn on the bolt as a longitudinal axis, or the bolt may turn within the bore of the clevis, to absorb shocks or strains caused by relative movement of these parts.

The two ears 10, 10 of the clevis are formed with axially alined bores 11, 11, and a circular, flat, horizontally disposed coupling head 12, having a vertical hole or coupling socket 13, is pivotally mounted on a transversely arranged horizontal axis in the clevis. For this purpose the coupling head is fashioned with a flat integral and short rearwardly extending arm 14 that terminates in a transverse pivot bar 15 the ends of which are journaled in the bores or bearings 11 of the clevis.

The trunnions or pivotal bosses formed by the opposite ends of the cross bar 15 may be integral with the arm 14 of the coupling head, or as indicated in the drawings, the cross bar may be welded to the arm, as indicated at 16, to form a rigid coupling member. This pivotal joint on a transverse horizontal axis between the clevis and the coupling head permits up and down or vertical relative movements between the clevis and the coupling member, which absorb stresses and strains imposed by either a tractor or a trailer, on the hitch.

A trailer may be coupled to the towing tractor or other automotive vehicle equipped with the two way hitch by any suitable coupling means, as a coupling pin passed through the bore or socket 13 of the coupling head and also through a complementary coupling member of the trailer; and the flexible joint insures a constantly correct position of the coupling head 12 that permits easy manipulation of the coupling pin or other coupler.

The draw bar and coupling thus equipped permit the tractor to travel in one angular position, while the trailer is tilted or leaning in the opposite direction, and the swivel joint absorbs strains and stresses that might otherwise bend, bind, or break the draw bar of the tractor or the draftbeam of the trailer. The pivotal joint between the clevis and the coupling head also absorbs strains and stresses due to vertical movements of the tractor and trailer as the coupled implements travel over irregular ground surfaces that cause relative movements of the tractor and trailer.

Having thus fully described my invention what I claim as new and desire to secure by Letters Patent is:

1. A draw bar terminating in a forked swivel head rigid with and enclosing an end of the draw bar and having an integral longitudinally extending bolt, a U-shaped clevis swiveled on the bolt and a lock nut on the bolt for retaining the clevis against the face of the head, and a horizontally disposed coupling head having axially alined bosses pivotally mounted in the clevis transversely of the swivel head.

2. The combination with a draw bar for a tractor, of a forked swivel head rigid with and enclosing an end of the draw bar, a longitudinally projecting bolt integral with the head, a clevis swiveled on the bolt and means for retaining the clevis against the face of the head, and a horizontally disposed coupling head pivotally mounted in the clevis on an axis transversely of the longitudinally projecting bolt.

3. In a draw bar for a tractor, the combination with a forked swivel head welded on the end of the draw bar, a longitudinally extending bolt integral with the head, a U-shaped clevis swiveled on the bolt, and a lock nut for retaining the clevis against said head, of a horizontally disposed coupling head having an integral arm, a pivot bar welded to said arm, and end bosses of said bar arranged transversely of the bolt and pivoted in the clevis.

RAY S. KELTNER.

REFERENCES CITED

The following references are of record in the file of this patent:

UNITED STATES PATENTS

| Number | Name | Date |
|---|---|---|
| 583,767 | Nelson | June 1, 1897 |
| 2,057,658 | Bryant | Oct. 20, 1936 |
| 2,064,615 | Kuchar | Dec. 15, 1936 |